(12) United States Patent
Xu et al.

(10) Patent No.: US 10,521,694 B2
(45) Date of Patent: Dec. 31, 2019

(54) 3D BUILDING EXTRACTION APPARATUS, METHOD AND SYSTEM

(71) Applicant: The Chinese University of Hong Kong, Hong Kong (CN)

(72) Inventors: Yong Xu, Hong Kong (CN); Chao Ren, Hong Kong (CN); Peifeng Ma, Shenzhen (CN); Hui Lin, Hong Kong (CN); Yan Yung Ng, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 226 days.

(21) Appl. No.: 15/696,881

(22) Filed: Sep. 6, 2017

(65) Prior Publication Data

US 2018/0075319 A1     Mar. 15, 2018

Related U.S. Application Data

(60) Provisional application No. 62/385,505, filed on Sep. 9, 2016.

(51) Int. Cl.
*G06K 9/00*      (2006.01)
*G06K 9/62*      (2006.01)
*G06K 9/46*      (2006.01)

(52) U.S. Cl.
CPC ....... *G06K 9/6215* (2013.01); *G06K 9/00637* (2013.01); *G06K 9/4661* (2013.01)

(58) Field of Classification Search
CPC .... G06K 9/6215; G06K 9/00; G06K 9/00637; G06K 9/4661; G06K 9/0063; G06K 9/00476; G06K 9/3216; G06K 9/46; G06K 9/52; G06K 9/6298; G06K 9/00201; G06T 17/05; G06T 17/00; G06T 17/10; G06T 17/20; G06T 2207/10032; G06T 2207/30181; G06T 2207/10012; G06T 2207/10028; G06T 2207/10036;
(Continued)

(56) References Cited

U.S. PATENT DOCUMENTS 8,242,948 B1 * 8/2012 Burky ............... G01S 17/89
                                                                              342/25 R
8,531,472 B2 * 9/2013 Freund ............. G06T 11/001
                                                                              345/582
(Continued)

OTHER PUBLICATIONS

Angiati, Elena et al., "Identification of Roofs Perimeter From Aerial and Satellite Images", 2011 IEEE 17th International Conference on Digital Signal Processing (DSP), 2011, pp. 1-7. (Year: 2011).*
(Continued)

*Primary Examiner* — Jose L Couso
(74) *Attorney, Agent, or Firm* — Seed IP Law Group LLP

(57) ABSTRACT

Disclosed is a method for 3D building extraction, comprising: extracting building footprints from one or more stereo images for a building; determining, from rational polynomial coefficient of the stereo images, first height estimation of the extracted building footprints; obtaining, from multitemporal SAR images for the building, scatters with stable attributes; determining second height estimation for the determined scatters; and combining the first height estimation and the second height estimation to generate a fused height for each of the extracted building footprints.

21 Claims, 11 Drawing Sheets

(58) Field of Classification Search
CPC . G06T 2207/10044; G06T 2207/30184; G06T 15/20; G06T 2210/56; G06T 2210/04; G06T 2210/36; G06T 7/33; G06T 7/507; G06T 7/521; G06T 7/55; G06T 7/593; G06T 7/60; G06T 7/70; G06T 7/73; G06T 7/75; G06T 7/11; G06T 7/187; G06F 17/5004; B64G 2001/1028; B64G 2001/1035; G01C 11/06; G01C 21/005; G01S 13/86; G01S 13/867; G01S 13/90; G01S 17/89; H04N 13/10; H04N 13/189; H04N 19/136; H04N 2013/0081
See application file for complete search history.

(56) References Cited

U.S. PATENT DOCUMENTS

| | | | | |
|---|---|---|---|---|
| 9,208,612 | B2* | 12/2015 | Frahm | G06T 15/06 |
| 9,842,282 | B2* | 12/2017 | Liu | G06T 15/04 |
| 10,338,222 | B2* | 7/2019 | Schultz | G06T 7/0004 |
| 10,402,676 | B2* | 9/2019 | Wang | G06K 9/4604 |
| 10,424,047 | B2* | 9/2019 | Giuffrida | G06T 11/60 |
| 2003/0086604 | A1* | 5/2003 | Oniyama | G06F 17/5004 |
| | | | | 382/154 |
| 2008/0319723 | A1* | 12/2008 | Smith | G06T 17/05 |
| | | | | 703/2 |
| 2009/0089018 | A1* | 4/2009 | Kelley | G06T 17/05 |
| | | | | 703/1 |
| 2009/0154793 | A1* | 6/2009 | Shin | G06K 9/0063 |
| | | | | 382/154 |
| 2013/0108148 | A1* | 5/2013 | Goodman | G06T 7/136 |
| | | | | 382/154 |
| 2013/0191082 | A1* | 7/2013 | Barthelet | G06K 9/00637 |
| | | | | 703/1 |
| 2014/0125671 | A1* | 5/2014 | Vorobyov | G01C 11/00 |
| | | | | 345/427 |
| 2014/0320488 | A1* | 10/2014 | Ege | G06T 17/05 |
| | | | | 345/420 |
| 2015/0371431 | A1* | 12/2015 | Korb | G06T 9/00 |
| | | | | 382/113 |

OTHER PUBLICATIONS

Yousefi, Bardi et al., "A Novel Fuzzy Based Method for 3D Buildings Modelling in Urban Satellite Imagery", 2011 IEEE Conference on Open Systems, Sep. 25-28, 2011, pp. 190-195. (Year: 2011).*

Aksoy et al., "Image Mining Using Directional Spatial Constraints," *IEEE Geoscience and Remote Sensing Letters* 7(1):33-37, Jan. 2010.

Lafarge et al., "Automatic building extraction from DEMs using an object approach and application to the 3D-city modeling," *ISPRS Journal of Photogrammetry & Remote Sensing* 63:365-381, 2008.

Ma et al., "On the Performance of Reweighted $L_1$ Minimization for Tomographic SAR Imaging," *IEEE Geoscience and Remote Sensing Letters* 12(4):895-899, Apr. 2015.

Ok et al., "Automated Detection of Arbitrarily Shaped Buildings in Complex Environments From Monocular VHR Optical Satellite Imagery," *IEEE Transactions of Geoscience and Remote Sensing* 51(3):1701-1717, Mar. 2013.

Salehi et al., "Object-Based Classification of Urban Areas Using VHR Imagery and Height Points Ancillary Data," *Remote Sens.* 4:2256-2276, Aug. 3, 2012.

Xu et al., "Fusion of WorldView-2 Stereo and Multitemporal TerraSAR-X Images for Building Height Extraction in Urban Areas," *IEEE Geoscience and Remote Sensing Letters* 12(8):1795-1799, Aug. 2015.

\* cited by examiner

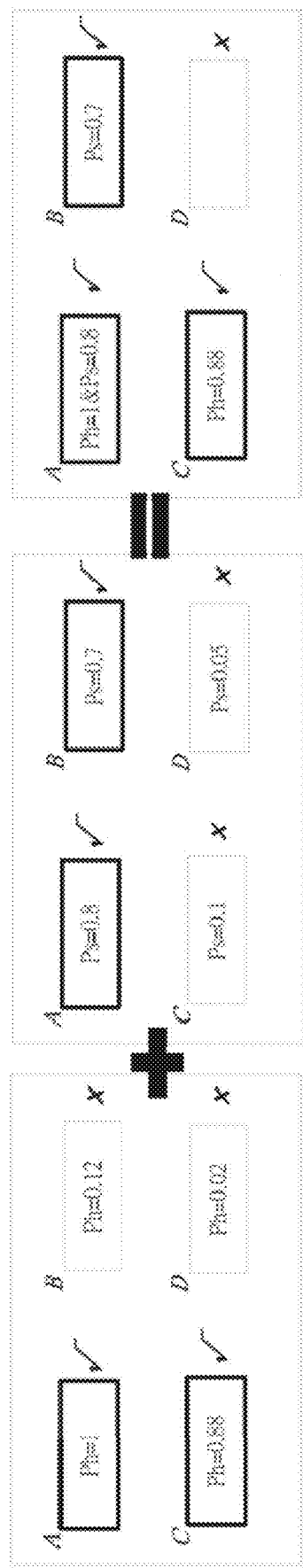

3D BUILDING EXTRACTION APPARATUS, METHOD AND SYSTEM

CROSS-REFERENCE TO RELATED APPLICATION

The present application claims priority benefit under 35 U.S.C. § 119(e) to U.S. Provisional Application No. 62/385,505, filed Sep. 9, 2016, which is hereby incorporated by reference in its entirety herein.

TECHNICAL FIELD

The present disclosure relates to a 3D building extraction method, an 3D building extraction apparatus and a 3D building extraction system. In particular, the present disclosure relates to a satellite-based 3D building extraction method, a satellite-based 3D building extraction apparatus and a satellite-based 3D building extraction system.

BACKGROUND

Urban building information is vital to urban planning and urban climate studies. However, for some cities, especially for those at developing countries, the lack of effective urban building information remains an issue. Remote sensing technology makes it possible to provide urban building information in a large area. In particular, with the recent launch of new high-resolution satellites (e.g., high spatial resolution world-view satellites and meters' resolution Terra-SAR satellites), more high quality satellite data are now available to support studies in which urban building information is retrieved. However, due to a complexity of building types (e.g., shapes, sizes, colors and textures) and their high similarity and proximity to other on-ground targets, the automatic and accurate extraction of building information from satellite images for large high-density urban area is still a challenge task. Therefore, it is necessary to develop fast and efficient 3D building extraction technology for large and complex urban area.

Earlier studies mainly focused on 2D building footprint extraction using optical satellite images in which various advanced image classification/feature extraction approaches have been developed. In these approaches, the spectral and shape information on buildings are the most widely used features for the building footprint extraction. To improve footprint extraction accuracy, other important features of buildings, like corners, edges, shadows and the heights of building, have been exploited.

With the development of advanced satellite technology (e.g., stereo photogrammetry technology using pairs of optical images (stereo images), synthetic aperture radar (SAR-) technology, and light detection and ranging data (LiDAR) technology), automatic building extraction technology, and especially building height extraction techniques, have risen to new levels. Stereo technology uses a pair of satellite images (stereo images) from different observation angles to retrieve the heights of buildings over the same area using photogrammetry technology. The main difficulty with stereo technology, however, is automatically retrieving the corresponding points of the same objects from a pair of satellite images (denoted stereoscopic matching technology). Thus, other advanced stereoscopic matching methods have been developed to improve height retrieval accuracy and automatic mapping capabilities. Further, some ancillary data have been exploited to improve height retrieval accuracy, e.g., by using multiple stereo images or other ancillary data, such as the digital elevation model.

SAR data can record distance information from a satellite to the Earth's surface, from which the height information of on-ground targets can be retrieved using inference SAR images or monoscopic SAR images. Similar to stereo images, stereo SAR images can also be applied to retrieve the heights of buildings by using radargrammetry technology. However, due to the different imaging mechanisms distinguishing SAR images from optical images, the conventional building footprint extraction methods used for optical images are not suitable for SAR images. Studies on building footprint extraction using SAR images have primarily focused on the exploitation of other important building features, such as statistical texture information, bright linear lines, and building shadows, based on which evidence-based approaches have been used to combine the retrieved features for building footprint extraction.

In recent years, 3D building extraction involving building footprint extraction and building height retrieval is proposed to improve the building extraction performance. Stereo and SAR images have relatively lower accuracy in retrieving building data but their costs are lower, making them quite suitable and practical for large area applications. In addition, the combination of optical satellite images and SAR data present a much better recognition performance for all kind of buildings.

SUMMARY

One of the objects of the present application is to propose a satellite-based 3D building extraction method for 3D building extraction in urban areas where single data method has been limited. The method may use optical satellite images to provide a high quality building footprint, based on which SAR data may be used to provide building height information. It has been found that taking advantage of optical images for building height retrieval may provide height information to complement SAR results. Moreover, height information retrieved from stereo images may in turn benefit building footprint extraction accuracy, given that the actual heights of buildings are generally higher than their surrounding non-building targets. The proposed approach may first exploit building height and shadow information as well as spectral and spatial information to retrieve building footprints, and then combine and assign height estimates obtained from both stereo and Terra-SAR images to each building footprint to reconstruct 3D building information.

According to an aspect of the present disclosure, a 3D building extraction method may comprise extracting building footprints from one or more stereo images for a building; determining first height estimation of the extracted building footprints based on rational polynomial coefficient of the stereo images which may be provided by image vendors; obtaining scatters with stable attributes from multi-temporal SAR images for the building; determining second height estimation for the determined scatters; combining the first height estimation and the second height estimation to generate a fused height for each of the extracted building footprints; and outputting the fused height.

According to an embodiment of the disclosure, extracting the building footprints may comprise removing non-building footprints from initial building footprints; obtaining building footprints height extraction from the stereo images; obtaining building footprints shadow extraction from the stereo images; and combining the building footprint height extraction and the building footprint shadow extraction to generate the building footprints.

According to an embodiment of the disclosure, removing the non-building footprints may comprise segmenting the stereo images into various homogenous objects; and removing at least one of vegetation, black bodies and roads objects from the various homogenous objects. As an example, the road objects may be removed by using a rule-based method; the vegetation objects may be removed by applying a normalized difference vegetation index; and the black bodies objects may be removed by applying a normalized difference water index.

According to an embodiment of the disclosure, initial height information for each of the building footprints may be obtained by subtracting a local minimum height from a maximum height of the building footprint. Based on the initial height information, a height-based membership may be assigned for each of the initial building footprints to reflect a probability of the each initial building footprint being an actual building.

According to an embodiment of the disclosure, obtaining the building footprints shadow extraction may comprise generating a fuzzy landscape around a shadow based on spatial relationship between buildings and shadows; overlapping the initial building footprints with the fuzzy landscape; and extracting a shadow-based average landscape for each of the initial building footprints. The shadow-based average landscape reflects a probability of the corresponding initial building footprint being an actual building.

According to an embodiment of the disclosure, the second height estimation may be obtained by using TomoSAR method based on the multi-temporal SAR images.

According to an embodiment of the disclosure, determining the first height estimation may comprises modeling a relationship between image control points and the corresponding object control points on ground; finding a same image point on a same object point from a pair of stereo images based on the relationship; and retrieving the first height estimation information based on the same point on the pair of stereo images. The image control points may reflect two-dimensional plane image points, and the object control points may reflect three-dimensional points on earth.

According to an embodiment of the disclosure, obtaining the second height estimation may comprise organizing SAR height points as SAR height objects; matching the SAR height objects with nearest building footprints based on overlapping areas between the SAR height objects and the nearest building footprints; and assigning the second height estimation to all matched building footprints.

According to an embodiment of the disclosure, a fused height for each of the extracted building footprints may be obtained by determining whether or not a difference between the first height estimation and the second height estimation is larger than a threshold. If yes, selecting a larger one from the first and second height estimation as the fused height; otherwise averaging the first height estimation and the second height estimation as the obtained fused height.

According to an aspect of the present disclosure, a device for 3D building extraction may comprise an extraction unit for extracting building footprints from one or more stereo images; a determination unit for determining, from rational polynomial coefficient of the stereo images, first height estimation of the extracted building footprints; an acquisition unit for obtaining second height estimation for scatters with stable attributes of the extracted building footprints from multi-temporal SAR images; and a combination unit for combining the first height estimation and the second height estimation to generate a fused height for each of the extracted building footprints.

According to an aspect of the present disclosure, a system for 3D building extraction may comprise: a memory for storing one or more computer-readable components; and a processor for running the components to perform operations of the system, wherein the components comprise: an extraction component for extracting building footprints from one or more stereo images; a first determination component for determining, from rational polynomial coefficient of the stereo images, first height estimation of the extracted building footprints; an acquisition component for obtaining scatters with stable attributes from multi-temporal SAR images for the building; a second determination component for determining second height estimation for the determined scatters; and a combination component for combining the first height estimation and the second height estimation to generate a fused height for each of the extracted building footprints.

According to an embodiment of the disclosure, the extraction unit/component may comprise a removing module for removing non-building footprints from initial building footprints; a first acquisition module for obtaining a height-based membership for each of the building footprints from the stereo images; a second acquisition module for obtaining an shadow-based average landscape for each of the building footprints from the stereo images; and a combination module for combining the height-based membership and the shadow-based average landscape to generate the building footprints.

According to an embodiment of the disclosure, the determination unit/component may comprise a modeling module for modeling a relationship between image control points and the corresponding object control points on ground; a finding module for finding a same image point on a same object point from a pair of stereo images based on the relationship; and a retrieving module for retrieving the first height estimation information based on the same point on the pair of stereo images.

According to an embodiment of the disclosure, the acquisition unit/component may comprise an organization module for organizing SAR height points as SAR height objects; a matching module for matching the SAR height objects with nearest building footprints based on overlapping areas between the SAR height objects and the nearest building footprints; and an assignation module for assigning the second height estimation to all matched building footprints.

According to an embodiment of the disclosure, the combination unit/component may comprise a decision module for determining whether or not a difference between the first height estimation and the second height estimation is larger than a threshold.

Another object of this application is to provide a storage media for storing a plurality of computer-readable instructions. The instructions may be executed to extract building footprints from one or more stereo images; determine first height estimation of the extracted building footprints from rational polynomial coefficient of the stereo images; obtain scatters with stable attributes from multi-temporal SAR images for the building; determine second height estimation for the determined scatters; and combine the first height estimation and the second height estimation to generate a fused height for each of the extracted building footprints.

BRIEF DESCRIPTIONS OF DRAWINGS

Exemplary non-limiting embodiments of the present disclosure are described below with reference to the attached drawings. The drawings are illustrative and generally not shown in an exact scale. The same or similar elements on different figures are referenced with the same reference numbers.

FIG. 5A-5C illustrate exemplary final building extraction results achieved by integrating both height-based and shadow-based information according to an embodiment of the present disclosure, with FIG. 5A showing height-based result with probability values, FIG. 5B showing shadow-based result with probability values and FIG. 5C showing final fused result;

Figure 10:
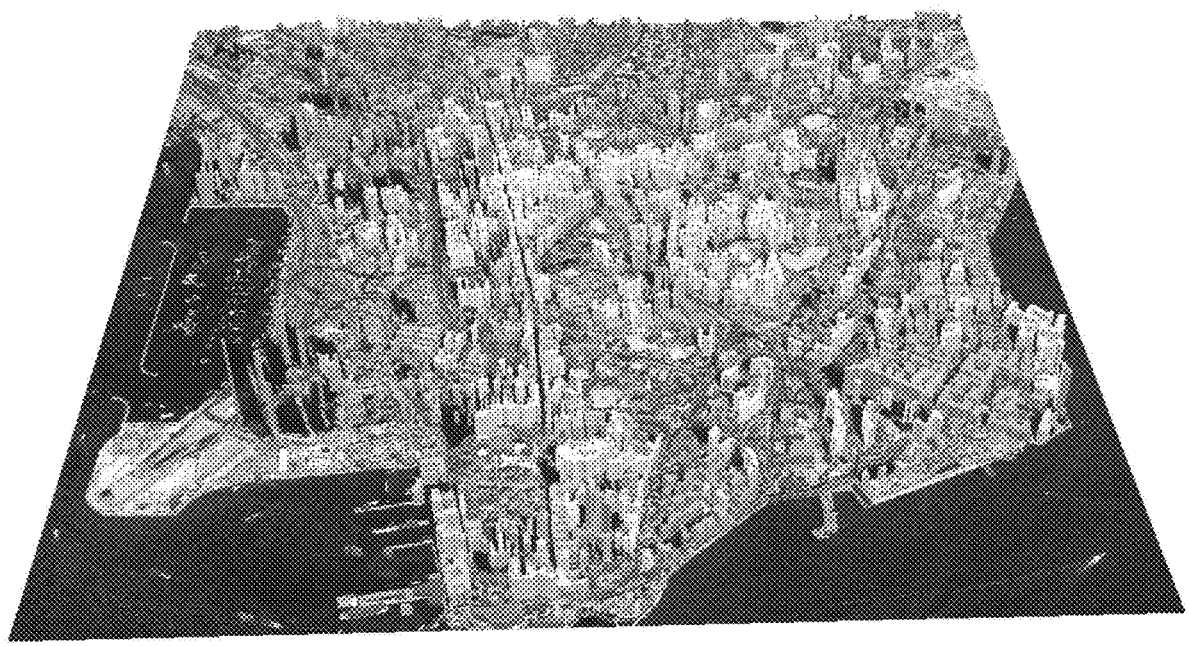
Figure 11A:
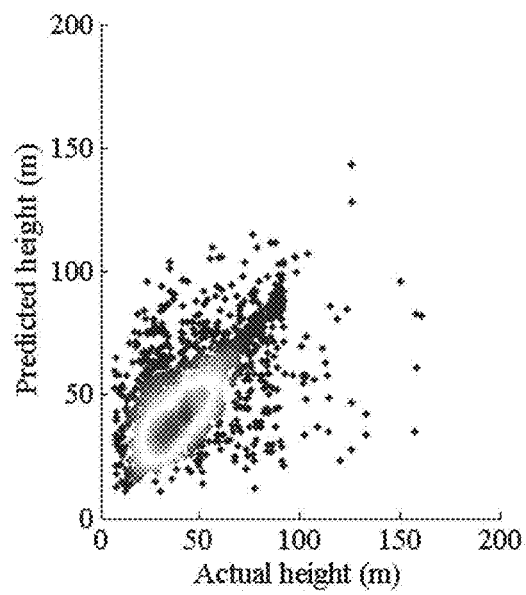
Figure 11B:
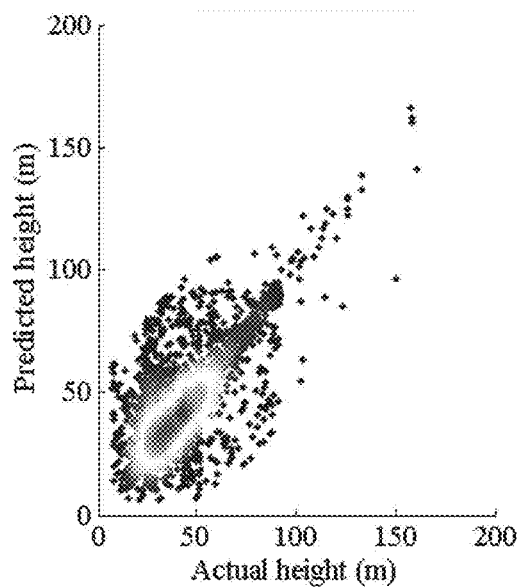

FIG. 10 illustrates building extraction result using the present proposed satellite-based method with both stereo and SAR images; and FIGS. 11A-11B illustrates scatter plots of different models by comparing the predicted building heights with actual building heights, with different colors showing the density of the scatter points, wherein FIG. 11A shows the result with conventional approach using stereo images, and FIG. 11B shows the result with present proposed approach using both stereo and SAR images.

DETAILED DESCRIPTIONS

Reference will now be made in detail to some specific embodiments of the disclosure including the best modes contemplated by the inventors for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims. In the following description, numerous specific details are set forth in order to provide a thorough understanding of the present disclosure. The present disclosure may be practiced without some or all of these specific details. In other instances, well-known process operations have not been described in detail in order not to unnecessarily obscure the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The proposed 3D building extraction method may comprise two main stages. First, building footprints may be extracted using shadow, height, spectral and spatial information from high-resolution stereo images. Second, based on the extracted building footprints, the initial height estimated from both the stereo images and the Terra-SAR images may be combined and assigned to a building footprint to achieve 3D building information.

Figure 1:
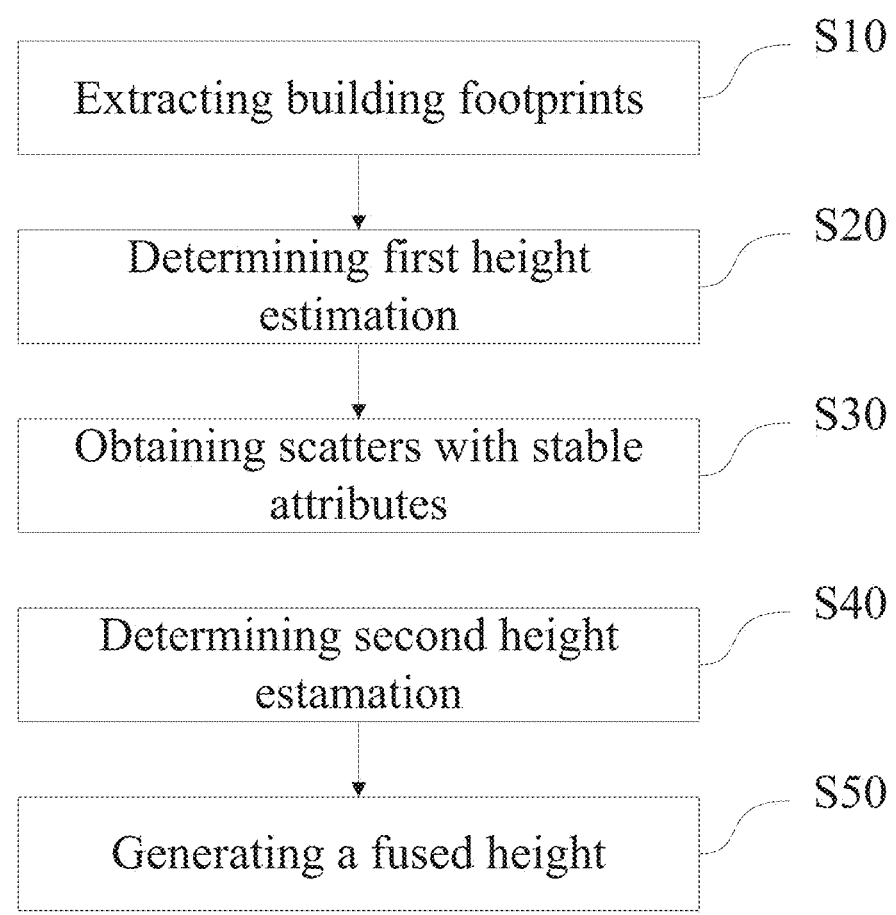
FIG. 1 illustrates a schematic flow diagram of the 3D building extraction method according to the present disclosure.

As shown in FIG. 1, the method may begin at step S10 to extract building footprints from one or more stereo images for buildings of an urban. Then in step S20, the first height estimations of the extracted building footprints may be determined from rational polynomial coefficient of the stereo images. The rational polynomial coefficients of the images may be provided by image vendors. The second height estimations of the buildings may be obtained from multi-temporal SAR images for the building, which is implemented in steps S30 and S40. Since the SAR images can only capture objects with stable attributes, in step S30, only scatters with stable attributes may be obtained from multi-temporal SAR images for the building. Then in step S40, the second height estimation for the determined scatters may be determined using TomoSAR technique. After the first and second height estimations for a specific building is determined, the first height estimation and the second height estimation may be combined to generate a fused height for each of the extracted building footprints and then the fused height can be outputted.

The detail implementations of the method may be described as below with reference to FIGS. 2-6.

Figure 2:
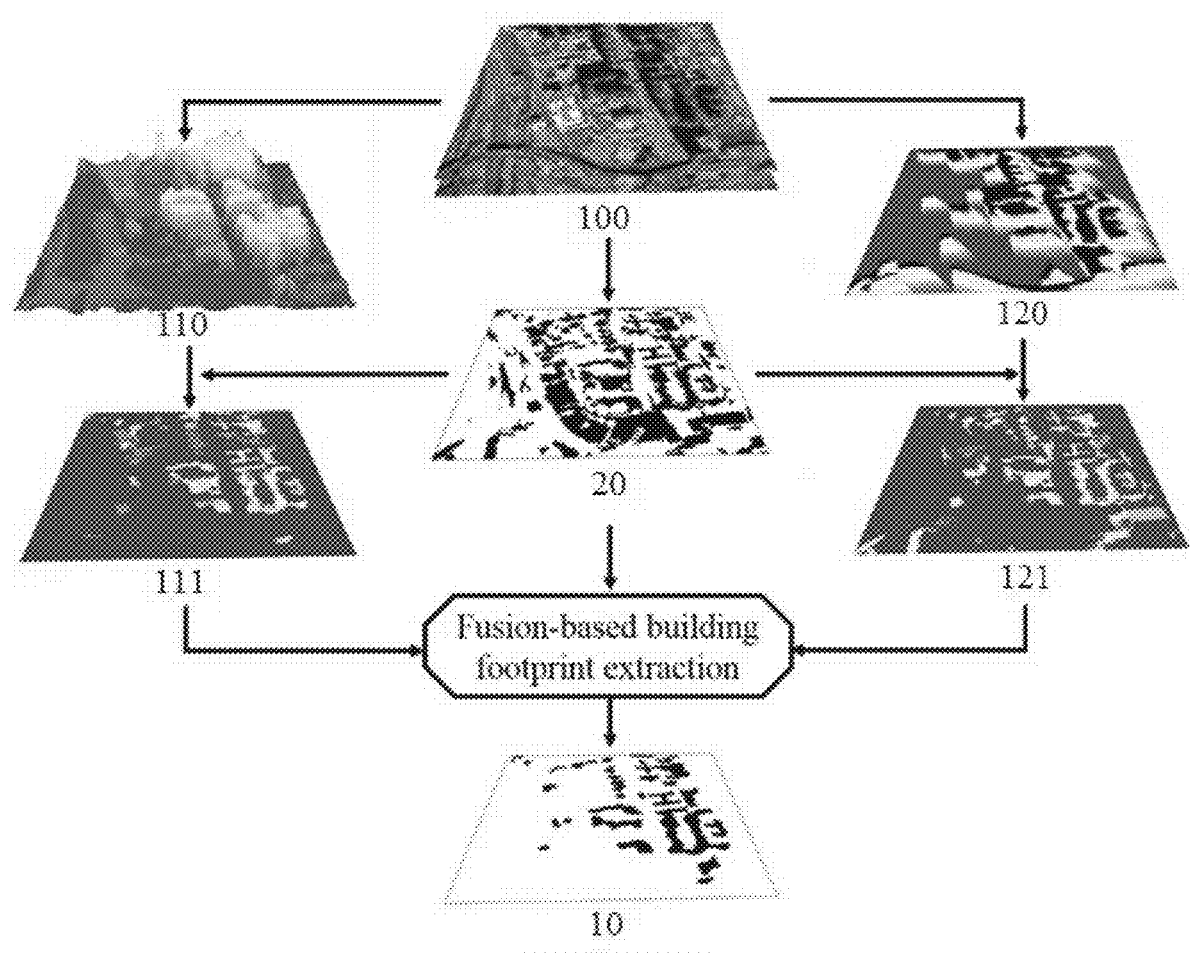
FIG. 2 illustrates a schematic procedure of a building footprint extraction method according to an embodiment of the present disclosure.

FIG. 2 illustrates a schematic overall procedure of a building footprint extraction method, i.e., step S10, which includes four main stages, according to an embodiment of the present disclosure. In this procedure, building footprints 10 may be extracted using, for example, four important features from image data of the stereo images 100: spectral, shape, shadow, and height information. The image data may be, for example, any satellite data. First, the initial building footprints 20 may be extracted from optical images (stereo images) 100 using the object-based classification method. Second, based on the initial building footprints 20, the digital height estimates 110 derived from the images 100 may be exploited to remove some non-buildings and to obtain height-based building extraction information 111, given that actual buildings are usually higher than their surrounding targets. Third, similar to height estimates 110, shadow-based fuzzy landscape 120 may be exploited to generate shadow-based building footprint extraction information 121, given that actual buildings usually include the shadows surrounding them as contextual information. Finally, both height-based and shadow-based building extraction information 111 and 121 may be combined to generate final building footprint extraction information 10.

In an embodiment of the present disclosure, an object-based classification method may be used to extract initial building footprints 10 from high-resolution stereo images 100. The main idea of this method is to segment the satellite image 100 into various homogenous objects, and then select out the objects with building features as the initial candidates.

In practice, a removal process may be adopted to select the objects likely to be buildings. In this process, as an example, three categories of non-building objects including vegetation, black bodies (e.g., water and shadows), and roads, which are significantly different from the buildings, were first removed using a rule-based method. In particular, the normalized difference vegetation index (NDVI) and normalized difference water index (NDWI) may be applied to remove the vegetation and black bodies, respectively. Given that some non-building objects have apparently different shapes than buildings, shape indices (e.g., ratio between length and width) may be utilized to filter out these objects. The roads may be removed from the various homogenous objects based on a shape index. Herein, shape index reflects the border length of the object divided by the square root of its area. More shape indices (e.g., shape index and object width/length ratio) can get better performance in removing non-building objects. The remaining objects would be assigned to the initially extracted building footprints.

Following the initial building footprints extraction is a height-based building extraction. In this stage, the height estimates 110 obtained from the stereo images may be used to distinguish actual building footprints from the initially extracted building footprints 20, given that height information is helpful in differentiating actual buildings from their surrounding non-buildings.

Based on the height estimates 110 obtained from the stereo images 100, the initial height information 111 for each footprint may be obtained by subtracting the local minimum value of the initial height from the maximum value of the initial height (step S20).

Figure 3A:
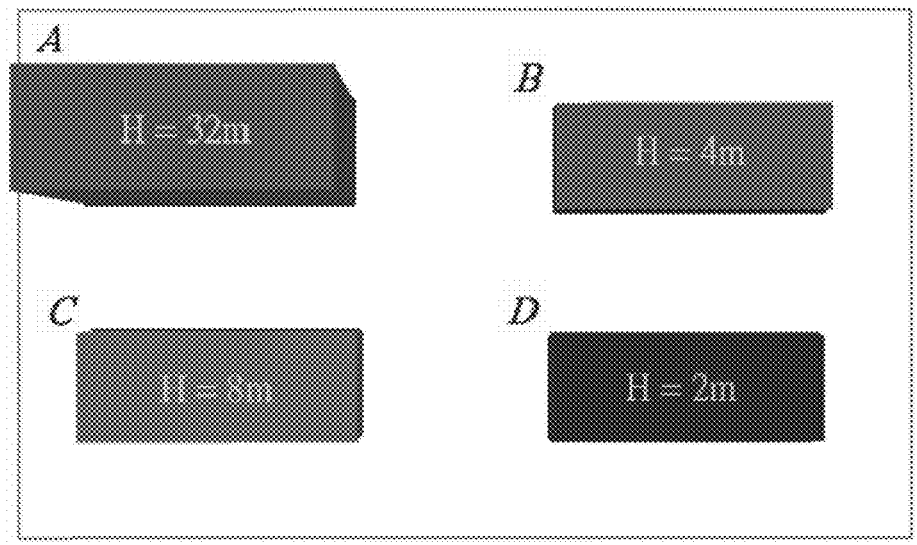
FIG. 3A illustrates exemplary height information for possible building footprint according to an embodiment of the present disclosure.
Figure 3B:
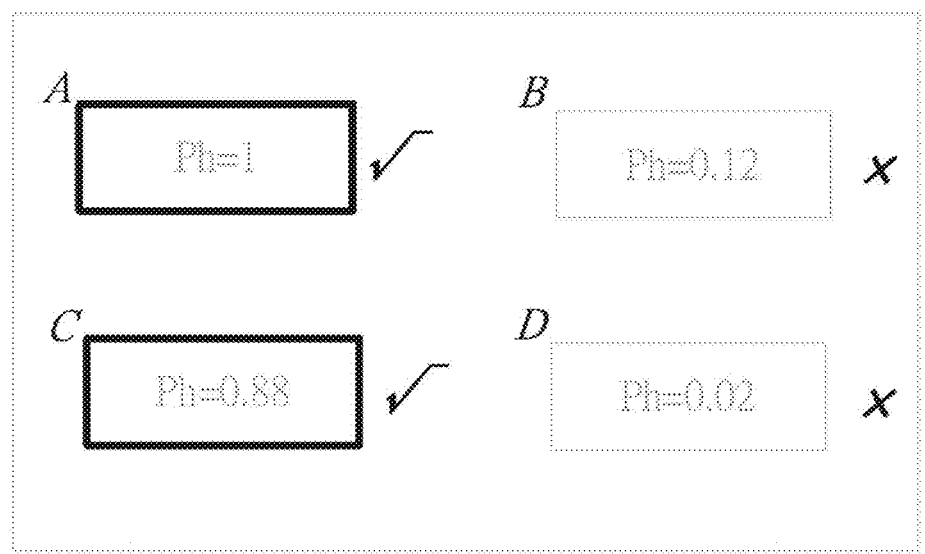
FIG. 3B illustrates exemplary height-based building probability result according to an embodiment of the present disclosure.

FIGS. 3A-3B illustrate an exemplary height-based method for actual building extraction according to an embodiment of the present disclosure. As shown in FIG. 3A, an exemplary initial height model may be derived from stereo images 100, from which the heights of footprints A, B, C and D may be estimated as, for example, 32, 4, 8 and 2 meters, respectively. Thus, it may be inferred that footprints A and C are likely to be actual buildings, and footprints B and D might not be actual buildings due to their relatively low building heights.

To make results more flexible, all footprints may be assigned with a fuzzy membership value of buildings [0 1] according to their heights, using the following formula for building footprint i, $$Ph(i) = \frac{1}{1 + \exp(h_0 - h(i))} \quad 1)$$

where Ph(i) denotes the probability of being an actual building for footprint i, h(i) is the height of the footprint i, and $h_0$ reflects a threshold building height, which for example, may be set to 6 meters in this disclosure.

The above model indicates that footprints with greater height are more likely to be real buildings, and those with lower height are more likely to be non-buildings. Thus, based on the above model, footprints A, B, C and D have probabilities of being actual buildings of 1.0, 0.12, 0.88, and 0.02, respectively.

Figure 4A:
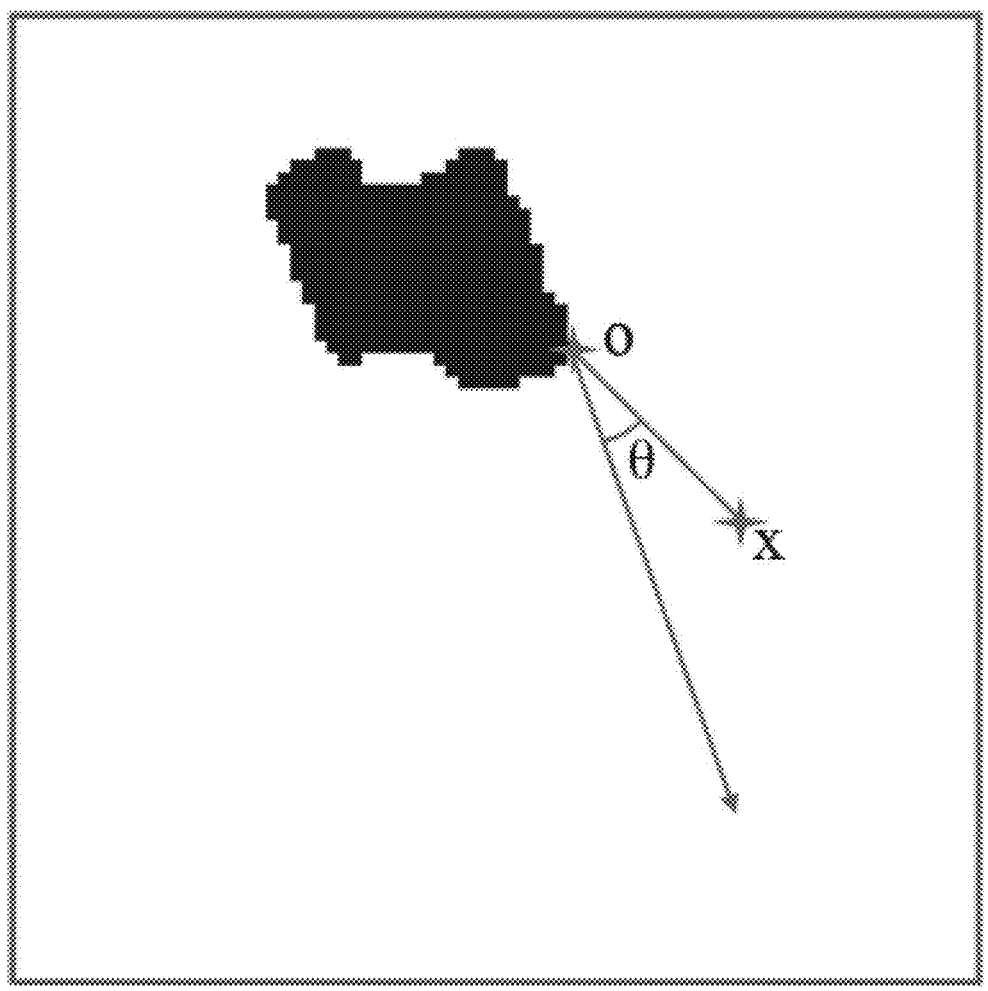
FIG. 4A illustrates an exemplary part of a shadow of a building according to an embodiment of the present disclosure.
Figure 4B:
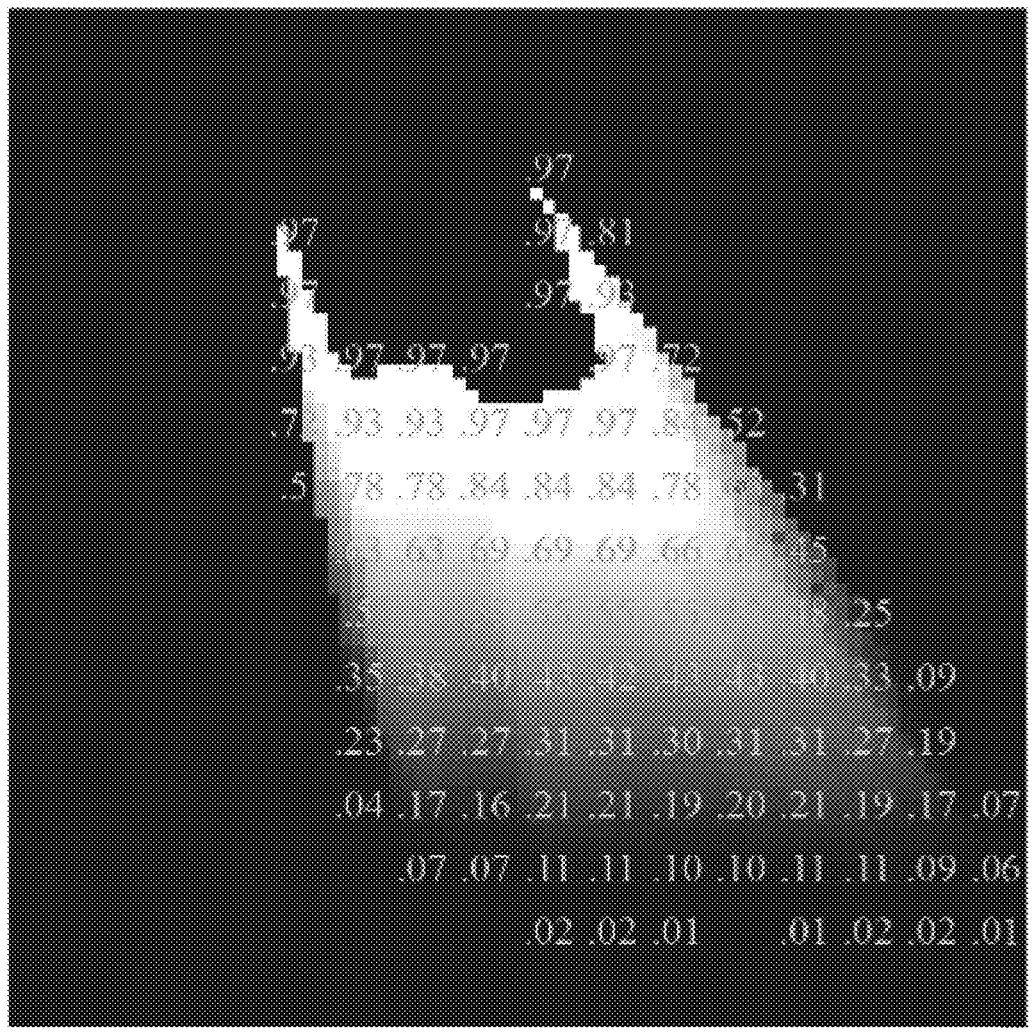
FIG. 4B illustrates fuzzy landscape with membership values for all pixels according to an embodiment of the present disclosure.
Figure 4C:
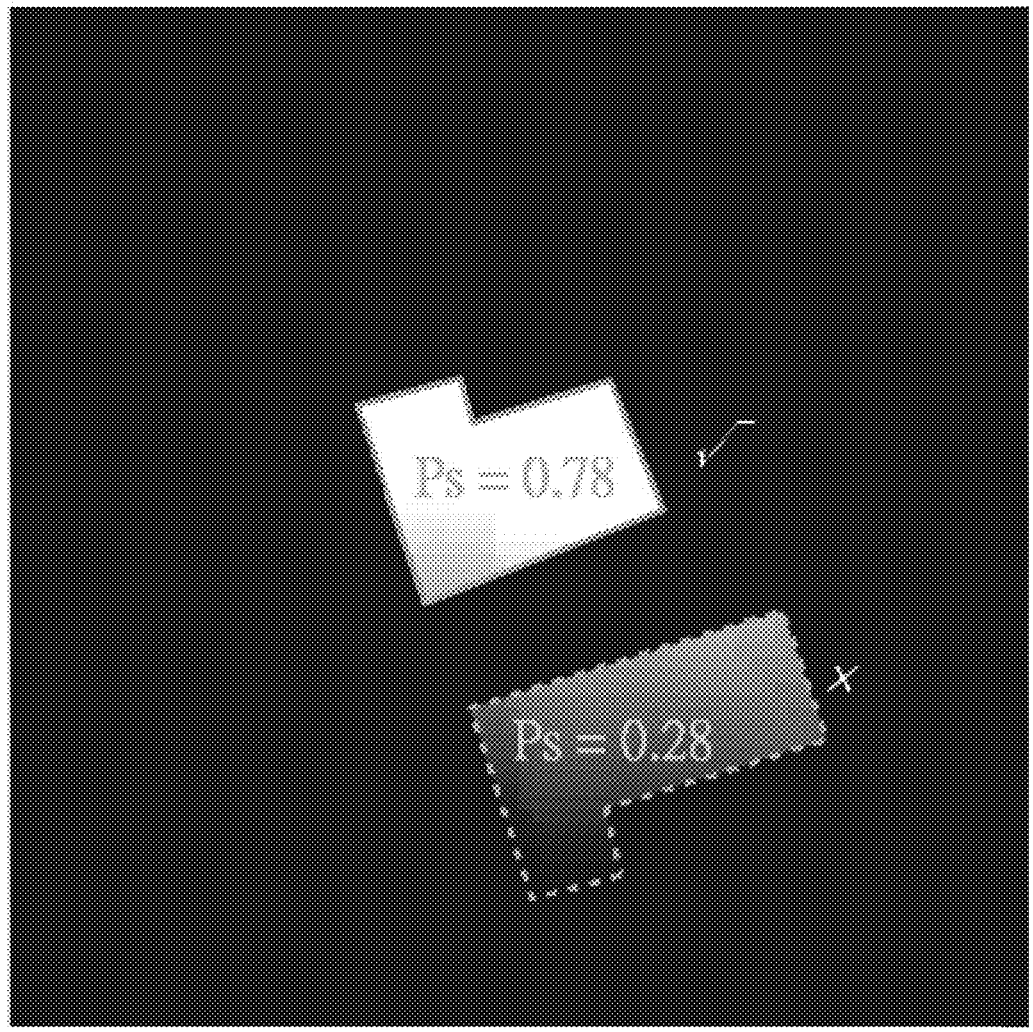
FIG. 4C illustrates exemplary shadow-based building probability result according to an embodiment of the present disclosure.

FIGS. 4A-4C illustrate an exemplary shadow-based method for actual building extraction according to an embodiment of the present disclosure. In building extraction field, shadow information may provide a clue for extracting actual buildings. In this stage, shadow information, rather than height information, may also be used to extract the actual buildings based on the initial building footprint information 20. One of the main ideas of shadow-based method is to use the directional spatial relationship between the buildings and the shadows to extract actual buildings, given that actual buildings should be close to the shadows and located in the opposite direction of illumination.

Using the initially obtained building footprints and the shadows as input, the proposed shadow-based footprint extraction method has two steps.

First, based on the spatial relationship between the buildings and the shadows, a fuzzy landscape around the shadow may be generated using the well known mathematical morphological method (referring to the following formula 2)). In the generated landscape, each location having a value of [0 1] will reflect the possibility of each point being an actual building.

As an example, FIGS. 4A and 4B illustrate the spatial relationship between the shadow and its landscape, with FIG. 4A showing part of a shadow and FIG. 4B showing the landscape generated. The values of landscape points measure their spatial relationship with the shadow in terms of their angular and radial distance. Given a landscape point x in the landscape and a reference point o in the shadow, for example, the value of the landscape point x may be estimated using the following formula, $$v_{\sigma,\kappa} = e^{-\left(\frac{\|\vec{ox}\|}{\sigma}\right)} \max\left\{0, 1 - \frac{2\|\vec{ox}\|}{\kappa}\right\} \quad 2)$$

where $\|\vec{ox}\|$ is the Euclidean distance of point o to the point x, the parameter $\sigma$ determines the rate of decrease of the exponential function, and $\kappa$ is the size of the structuring element utilized. The parameters $\sigma$ and $\kappa$, for example, may be set as 100 and 80 in this disclosure.

Given that different reference points in the shadow generate different results for each landscape point, the maximum value using all of the reference points in the shadow may be used as the final value of the landscape point.

Second, based on the fuzzy landscape obtained, the initial extracted building footprints would be overlapped with the generated fuzzy landscapes and the average landscape value for each building footprint may be extracted, so that each footprint has an average membership value reflecting the probability of "it being an actual building footprint". FIG. 4C shows the results for the determined footprints, with the two buildings having probability values of 0.78 and 0.28 of being actual buildings.

The use of either height or shadow may still have some limitations in detecting actual building footprints in complex urban scenarios. For example, some buildings might not be able to generate accurate height information from stereo images, and some blocked buildings may not have shadows, especially small buildings that are next to tall buildings. Thus, in this disclosure both height and shadow-based results will be combined to generate a better building extraction result.

In the above mentioned stages, two sets of building extraction results using either shadow or height information can be achieved. In both results, each building footprint has a unique value to show the probability of it being a real building with evidence of height or shadow. The combined results are based on a single principle that either height or shadow can support the probability that a footprint is an actual building.

FIGS. 5A-5C show how the height-based and shadow-based results can be combined to achieve final building extraction results. For a footprint I, if any result provides strong evidence supporting the existence of a building it should be an actual building. In FIGS. 5A-5C, using height or shadow information, and assuming that a footprint with strong evidence (e.g., a probability value above 0.6) that a building exists will be an actual building, the possible building footprints of A, B and C are actually buildings. Some footprints may not have strong evidence for either result, but the sum of both results having a high value could still be considered an actual building e.g., if both results are 0.5 and their sum is 1.0, it can still be considered an actual building. Using the above operations, all of the actual building footprints would be extracted. This is followed by a series of mathematic operations to remove the spurs and redundant connections between the buildings before the final result is obtained.

Figure 6:
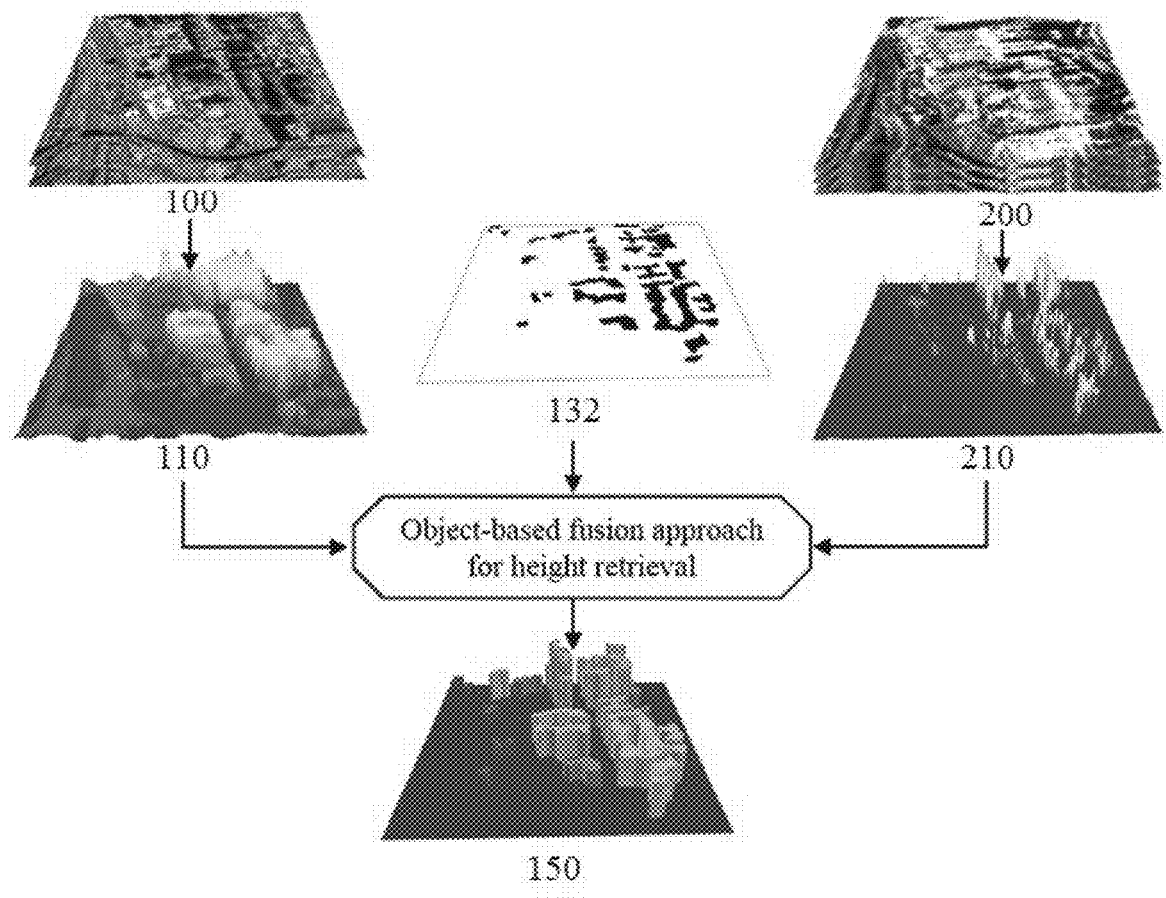
FIG. 6 illustrates a schematic procedure of the 3D building extraction method according to an embodiment of the present disclosure.

After obtaining the final building footprint, the second part of the method to building height extraction will be undertaken using both stereo and Terra-SAR images (step S30 and S40). The overall procedure of the height extraction method is shown in FIG. 6, in which the initial height estimates 110 and 210 would be first extracted from the stereo and Terra-SAR images 100 and 200, and then both of the initial height estimates 110 and 120 would be combined to provide more accurate height information for each building footprint using an object-based fusion approach.

In an embodiment of the disclosure, two initial height estimates 110 and 120 may be generated using SAR and stereo images 100 and 200, respectively. For stereo images 100, an empirical model may be used to estimate the height information 110 for each image point using the built-in rational polynomial coefficient (RPC) of the stereo images 100, wherein the built-in RPC is a set of polynomial coefficients to reflect the relationship between image control points and the corresponding object points on the ground. In this approach, the relationship between the image control points, reflecting the two-dimensional XY plane image points, and the corresponding object control points on the ground, reflecting the actual three-dimensional XYZ points on earth, may be first modeled using a group of rational functions. Then, based on the built relationship between the image points and object points on the ground, an attempt may be made to find the same image point on the same object point from a pair of satellite images (stereo images). From this, it became possible to retrieve the three-dimensional XYZ coordinates of this object point, including the XY coordinates and Z measuring height. Therefore, the heights for all image points could be retrieved.

In the embodiment of the present disclosure, the conventional TomoSAR technique with multi-temporal SAR images is used to obtain the height estimates of scatters with stable attributes. As an extension of the conventional interference SAR (Synthetic Aperture Radar) technique with two SAR images, multi-temporal SAR images may be used to estimate the height of mixed scatters within one signal unit in SAR images. However, this has limitations for conventional interferences being drawn from the SAR technique to obtain the height of such units, where multiple interfering scatters (also called layover problems) are contained, causing a signal separation problem before the actual height information of a scatter may be obtained. Hence, the conventional TomoSAR technique is developed, in which multi-temporal SAR data will be used to provide more redundant information and to separate interfering scatters in one SAR signal. The TomoSAR technique has been proven to be suitable for retrieving the heights of buildings in urban areas.

In order to achieve the final height retrieval, an object-based approach may be used. In this stage, height estimates from both stereo and SAR images 100 and 200 may be combined to generate a fused height result for all footprints.

For each building footprint, a height result may be obtained using height estimates from stereo images 100. To reduce the smoothing effect of height estimates 110 from stereo images 100, the maximum value of the extracted points may be considered as an extracted building height. Another height result may be achieved using height estimates from SAR images 200. However, SAR results tend to have large positioning errors, which affect the assignment of height information to the right buildings.

To reduce the effect of SAR positioning error on the estimation of building height, an object-based fusion approach may be proposed and used to extract the heights of buildings using SAR height estimates. It primarily includes three stages. First, SAR height points may be organized as objects using the connection component analysis method. Second, the SAR height objects may be matched with the nearest building footprints based on their overlapping areas. Third, for all matched footprints, heights may be assigned using the maximum value of the matching SAR height points.

For each footprint, two height estimates can be obtained (step S50), using the height estimates 110 and 210 from stereo and SAR images 100 and 200. However, the height estimates can be combined based on their differences. If there is a large difference, the higher value is the fused result. Otherwise, the average is the fused result. Due to their missing data problems, some buildings may not have SAR results. For these buildings, height results obtained from stereo images may be assigned to them.

Figure 7:
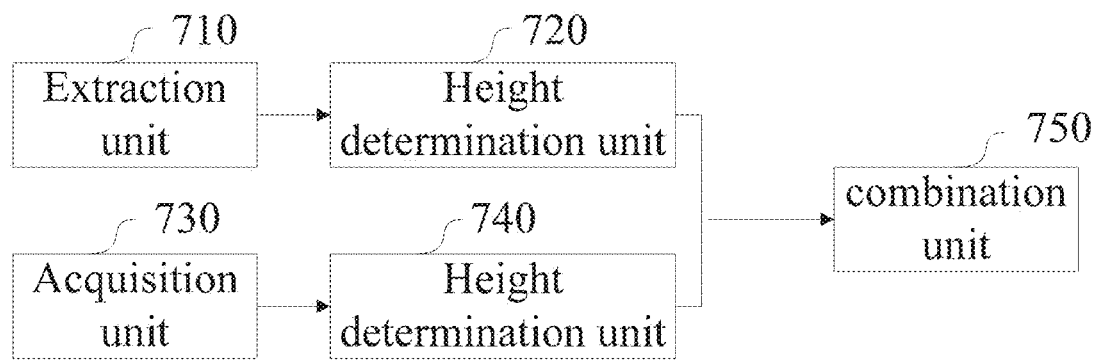
FIG. 7 illustrates a schematic block diagram of a 3D building extraction system according to an embodiment of the present disclosure.

FIG. 7 illustrates a device 700 for implementing a 3D building extraction method described above. Referring to FIG. 7, the device 700 may comprise: a building footprints extraction unit 710 for extracting building footprints from one or more stereo images for a building; determination unit 720 for determining first height estimation of the extracted building footprints from rational polynomial coefficient of the stereo images; an acquisition unit 730 for obtaining scatters with stable attributes from multi-temporal SAR images for the building; a determination unit 740 for determining second height estimation for the determined scatters; and a combination unit 750 for combining the first height estimation and the second height estimation to generate a fused height for each of the extracted building footprints.

As discussed in the above, the building footprints may comprise one or more of shadow, height, spectral, and spatial information.

In an embodiment of the present application, the extraction unit 710 may comprise: a removing module for removing non-building footprints from initial building footprints; a first acquisition module for obtaining a height-based membership for each of the building footprints from the stereo images; a second acquisition module for obtaining an shadow-based average landscape for each of the building footprints from the stereo images; and a combination module for combining the height-based membership and the shadow-based average landscape to generate the building footprints.

The removing module may be used to segment the stereo images into various homogenous objects and remove at least one of vegetation, black bodies and roads objects from the various homogenous objects. The first acquisition module may be used to obtain an initial height information for each of the building footprints by subtracting a local minimum height from a maximum height of the building footprint; and assign, based on the initial height information, the height-based membership for each of the initial building footprints, to reflect a probability of the each initial building footprint being an actual building.

The second acquisition module may be used to generate a fuzzy landscape around a shadow based on spatial relationship between buildings and shadows; overlap the initial building footprints with the fuzzy landscape; and extract the shadow-based average landscape for each of the initial building footprints, wherein the shadow-based average landscape reflects a probability of the corresponding initial building footprint being an actual building.

The first determination unit 720 may comprise: a modeling module for modeling a relationship between image control points and the corresponding object control points on ground; a finding module for finding a same image point on a same object point from a pair of stereo images based on the relationship; and a retrieving module for retrieving the first height estimation information based on the same point on the pair of stereo images, wherein the image control points reflect two-dimensional plane image points, and the object control points reflect three-dimensional points on earth.

The second determination unit 740 may comprise: an organization module for organizing SAR height points as SAR height objects; a matching module for matching the SAR height objects with nearest building footprints based on overlapping areas between the SAR height objects and the nearest building footprints; and an assignation module for assigning the second height estimation to all matched building footprints.

The combination unit 750 may comprise a decision module for determining whether or not a difference between the first height estimation and the second height estimation is larger than a threshold; if yes, the decision module selects a larger one from the first and second height estimation as the fused height; otherwise, the decision module averages the first height estimation and the second height estimation as the obtained fused height.

The detailed operations for the units 710-750 may also refer to the contents as discussed in reference descriptions for steps S10-S50.

Figure 8:
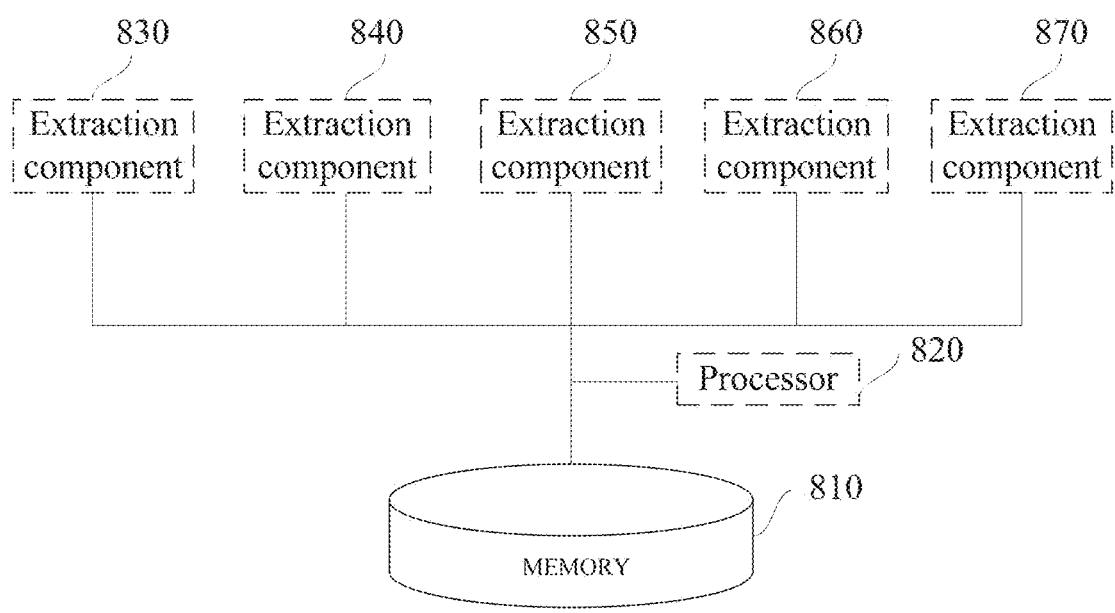
FIG. 8 illustrates a schematic block diagram of a computer system for carrying out the 3D building extraction method according to an embodiment of the present disclosure.

FIG. 8 illustrates a system 800 for implementing a 3D building extraction method described above in a computer. Referring to FIG. 8, the system 800 comprises a memory 810 that stores executable components and a processor 820 electrically coupled to the memory 810 to execute the executable components to perform operations of the system 800. The executable components may comprise: a building footprints extraction component 830 for extracting building footprints from one or more stereo images for a building; determination component 840 for determining first height estimation of the extracted building footprints from rational polynomial coefficient of the stereo images; an acquisition component 850 for obtaining scatters with stable attributes from multi-temporal SAR images for the building; a determination component 860 for determining second height estimation for the determined scatters; and a combination component 870 for combining the first height estimation and the second height estimation to generate a fused height for each of the extracted building footprints.

As discussed in the above, the building footprints may comprise one or more of shadow, height, spectral, and spatial information.

In an embodiment of the present application, the extraction component 830 may comprise: a removing module for removing non-building footprints from initial building footprints; a first acquisition module for obtaining a height-based membership for each of the building footprints from the stereo images; a second acquisition module for obtaining an shadow-based average landscape for each of the building footprints from the stereo images; and a combination module for combining the height-based membership and the shadow-based average landscape to generate the building footprints.

The removing module may be used to segment the stereo images into various homogenous objects and remove at least one of vegetation, black bodies and roads objects from the various homogenous objects. The first acquisition module may be used to obtain an initial height information for each of the building footprints by subtracting a local minimum height from a maximum height of the building footprint; and assign, based on the initial height information, the height-based membership for each of the initial building footprints, to reflect a probability of the each initial building footprint being an actual building.

The second acquisition module may be used to generate a fuzzy landscape around a shadow based on spatial relationship between buildings and shadows; overlap the initial building footprints with the fuzzy landscape; and extract the shadow-based average landscape for each of the initial building footprints, wherein the shadow-based average landscape reflects a probability of the corresponding initial building footprint being an actual building.

The first determination component 840 may comprise: a modeling module for modeling a relationship between image control points and the corresponding object control points on ground; a finding module for finding a same image point on a same object point from a pair of stereo images based on the relationship; and a retrieving module for retrieving the first height estimation information based on the same point on the pair of stereo images, wherein the image control points reflect two-dimensional plane image points, and the object control points reflect three-dimensional points on earth.

The second determination component 860 may comprise: an organization module for organizing SAR height points as SAR height objects; a matching module for matching the SAR height objects with nearest building footprints based on overlapping areas between the SAR height objects and the nearest building footprints; and an assignation module for assigning the second height estimation to all matched building footprints.

The combination component 870 may comprise a decision module for determining whether or not a difference between the first height estimation and the second height estimation is larger than a threshold; if yes, the decision module selects a larger one from the first and second height estimation as the fused height; otherwise, the decision module averages the first height estimation and the second height estimation as the obtained fused height.

The detailed operations for the components 830-870 may also refer to the contents as discussed in reference descriptions for steps S10-S50.

Figure 9:
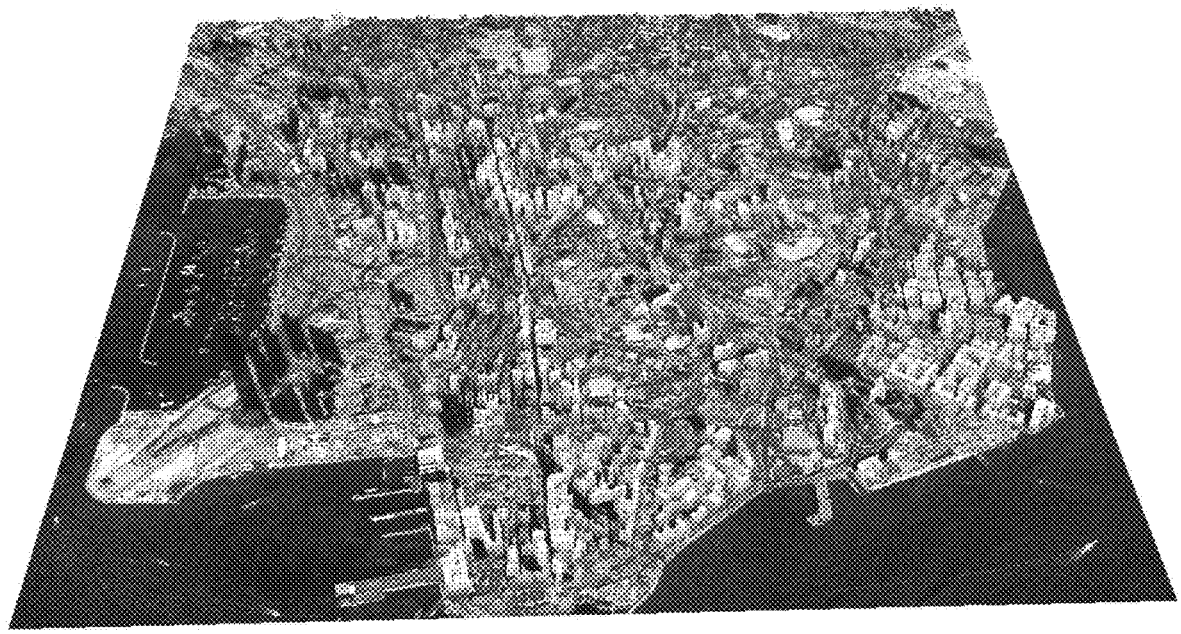
FIG. 9 illustrates building extraction result with conventional satellite-based method using stereo images.

FIGS. 9 and 10 give two different building models, in which FIG. 9 shows the result with conventional satellite-based method, while FIG. 10 presents the result with present proposed method using both stereo and SAR images.

The accuracy statistics for two results are provided in Table 1, in which two widely used planning indicators including building coverage ratio (BCR) and building volume density (BVD) between predicted result and actual building data are used. Both indicators range from 0 to 1, larger value indicates better prediction result. From these results, it is apparent that the building model with the present proposed approach is better than the model with conventional approach using stereo data. The overall BCR prediction accuracy of the proposed method is 77%, compared with the results from the stereo images is 72%. The overall BVD accuracy using the proposed approach is 75%, compared with the results using stereo images is 69%.

TABLE 1

|  | BCR accuracy (%) | BVD accuracy (%) |
| --- | --- | --- |
| Conventional approach | 72 | 69 |
| Proposed approach | 77 | 75 |

Scatter plots may be also used to reflect the performance of different approaches in retrieving building heights. As shown in FIGS. 11A and 11B, in which the x coordinate indicates the actual building height while the y coordinate indicates the predicted building height. The results using both conventional method and the present proposed method are shown in FIGS. 11A and 11B. It is clear that the results obtained using the proposed method are better than the conventional one. Conventional approach using stereo images performed better for buildings with low heights, however it has low prediction accuracy for most of tall buildings. Compared with the results from stereo images, the results using the proposed approach performed much better for all kinds of buildings.

Although the preferred examples of the present invention have been described, those skilled in the art can make variations or modifications to these examples upon knowing the basic inventive concept. The appended claims are intended to be considered as comprising the preferred examples and all the variations or modifications fell into the scope of the present invention.

Obviously, those skilled in the art can make variations or modifications to the present invention without departing the spirit and scope of the present invention. As such, if these variations or modifications belong to the scope of the claims and equivalent technique, they may also fall into the scope of the present invention.

What is claimed is:

1. A 3D building extraction method, comprising:
    extracting building footprints from one or more stereo images for a building, wherein the extracting comprises:
        removing non-building footprints from one or more initial building footprints of the stereo images;
        obtaining, from the stereo images, building footprints height;
        obtaining, from the stereo images, building footprints shadow; and
        combining the building footprint height and the building footprint shadow to generate the extracted building footprints;
    determining, from rational polynomial coefficients of the stereo images, first height estimation of the extracted building footprints;
    obtaining, from multi-temporal synthetic aperture radar images for the building, scatters with stable attributes;
    determining second height estimation of the building from the determined scatters; and
    combining the first height estimation and the second height estimation to generate a fused height for each of the extracted building footprints.

2. The method according to claim 1, wherein the building footprints comprise one or more of shadow, height, spectral, and spatial information for the building.

3. The method according to claim 1, wherein the removing comprises:
    segmenting the stereo images into various homogenous objects; and
    removing at least one of vegetation objects, black body objects and roads objects from the various homogenous objects.

4. The method according to claim 3, further comprising:
    removing the road objects from the various homogenous objects based on a shape index.

5. The method according to claim 3, further comprising:
    removing the vegetation objects based on a normalized difference vegetation index.

6. The method according to claim 3, further comprising:
    removing the black bodies objects based on a normalized difference water index.

7. The method according to claim 1, wherein the obtaining the building footprints height comprises:
    obtaining an initial height for each of the building footprints by subtracting a local minimum height from a maximum height of the building footprint; and
    assigning, based on the initial height, a height-based membership for each of the initial building footprints, to reflect a probability of the each initial building footprint being an actual building.

8. The method according to claim 7, wherein the obtaining building footprints shadow comprises:
    generating a fuzzy landscape around a shadow based on a spatial relationship between the building and the shadow;
    overlapping the initial building footprints with the fuzzy landscape; and
    extracting a shadow-based average landscape for each of the initial building footprints, wherein the shadow-based average landscape reflects a probability of a corresponding initial building footprint being an actual building.

9. The method according to claim 8, wherein the extracting building footprints comprises:
    combining the height-based membership and the shadow-based average landscape to determine whether the corresponding initial building footprint is an actual building.

10. The method according to claim 1, wherein the determining comprises:
    modeling a relationship between image control points and corresponding object control points on ground;
    finding a same image point on a same object point from a pair of stereo images based on the relationship; and retrieving the first height estimation based on the same point on the pair of stereo images,
wherein the image control points reflect two-dimensional plane image points, and the object control points reflect three-dimensional points on earth.

11. The method according to claim 1, wherein the obtaining second height estimation comprises:
organizing synthetic aperture radar height points as synthetic aperture radar height objects;
matching the synthetic aperture radar height objects with nearest building footprints based on overlapping areas between the synthetic aperture radar height objects and nearest building footprints; and
assigning the second height estimation to all matched building footprints.

12. The method according to claim 1, wherein the combining comprises:
determining whether or not a difference between the first height estimation and the second height estimation is larger than a threshold;
if yes, selecting a larger one from the first and second height estimation as the fused height; otherwise,
averaging the first height estimation and the second height estimation as the obtained fused height.

13. A system for 3D building extraction, comprising:
a memory for storing one or more computer-readable components; and
a processor for running the components to perform operations of the system,
wherein the components comprise:
an extraction component for extracting building footprints from one or more stereo images, wherein the extraction component comprises:
a removing module for removing non-building footprints from initial building footprints;
a first acquisition module for obtaining a height-based membership for each of the building footprints from the stereo images;
a second acquisition module for obtaining an shadow-based average landscape for each of the building footprints from the stereo images; and
a combination module for combining the height-based membership and the shadow-based average landscape to generate the building footprints;
a first determination component for determining, from rational polynomial coefficient of the stereo images, first height estimation of the extracted building footprints;
an acquisition component for obtaining scatters with stable attributes from multi-temporal synthetic aperture radar images for the building;
a second determination component for determining second height estimation for the determined scatters; and
a combination component for combining the first height estimation and the second height estimation to generate a fused height for each of the extracted building footprints.

14. The system according to claim 13, wherein the building footprints comprise one or more of shadow, height, spectral, and spatial information for the building.

15. The system according to claim 13, wherein the removing module is used to segment the stereo images into various homogenous objects and remove at least one of vegetation objects, black body objects and roads objects from the various homogenous objects.

16. The system according to claim 13, wherein the first acquisition module is used to obtain an initial height for each of the building footprints by subtracting a local minimum height from a maximum height of the building footprint; and
assign, based on the initial height, the height-based membership for each of the initial building footprints, to reflect a probability of the each initial building footprint being an actual building.

17. The system according to claim 13, wherein the second acquisition module is used to generate a fuzzy landscape around a shadow based on a spatial relationship between the building and the shadow;
overlap the initial building footprints with the fuzzy landscape; and
extract the shadow-based average landscape for each of the initial building footprints, wherein the shadow-based average landscape reflects a probability of a corresponding initial building footprint being an actual building.

18. The system according to claim 13, wherein the first determination component comprises:
a modeling module for modeling a relationship between image control points and corresponding object control points on ground;
a finding module for finding a same image point on a same object point from a pair of stereo images based on the relationship; and
a retrieving module for retrieving the first height estimation based on the same point on the pair of stereo images,
wherein the image control points reflect two-dimensional plane image points, and the object control points reflect three-dimensional points on earth.

19. The system according to claim 13, wherein the second determination component comprises:
an organization module for organizing synthetic aperture radar height points as synthetic aperture radar height objects;
a matching module for matching the synthetic aperture radar height objects with nearest building footprints based on overlapping areas between the synthetic aperture radar height objects and nearest building footprints; and
an assignation module for assigning the second height estimation to all matched building footprints.

20. The system according to claim 13, wherein the combination component comprises a decision module for determining whether or not a difference between the first height estimation and the second height estimation is larger than a threshold;
if yes, the decision module selects a larger one from the first and second height estimation as the fused height; otherwise,
the decision module averages the first height estimation and the second height estimation as the obtained fused height.

21. A non-transitory storage media for storing a plurality of computer-readable instructions executable to,
extract building footprints from one or more stereo images, which comprises:
remove non-building footprints from one or more initial building footprints of the stereo images;
obtain, from the stereo images, building footprints height;
obtain, from the stereo images, building footprints shadow; and
combine the building footprint height and the building footprint shadow to generate the extracted building footprints;

determine, from rational polynomial coefficient of the stereo images, first height estimation of the extracted building footprints;

obtain scatters with stable attributes from multi-temporal synthetic aperture radar (SAR) images for the building;

determine second height estimation for the determined scatters; and combine the first height estimation and the second height estimation to generate a fused height for each of the extracted building footprints.

* * * * *